United States Patent
Oakes et al.

(10) Patent No.: US 12,030,735 B2
(45) Date of Patent: Jul. 9, 2024

(54) ADJUSTABLE FIELD OF VIEW LASER SYSTEM FOR WEB PROCESSING

(71) Applicant: Delta Industrial Services, Inc., Ramsey, MN (US)

(72) Inventors: Joel Oakes, Princeton, MN (US); Evan Schiebout, Oak Grove, MN (US)

(73) Assignee: Delta Industrial Services, Inc., Minneapolis, MN (US)

( * ) Notice: Subject to any disclaimer, the term of this patent is extended or adjusted under 35 U.S.C. 154(b) by 543 days.

(21) Appl. No.: 16/949,505

(22) Filed: Oct. 30, 2020

(65) Prior Publication Data
US 2022/0135358 A1    May 5, 2022

(51) Int. Cl.
| | |
|---|---|
| *B65H 19/20* | (2006.01) |
| *B23K 26/06* | (2014.01) |
| *B23K 26/08* | (2014.01) |
| *B65H 19/10* | (2006.01) |
| *B65H 19/18* | (2006.01) |

(Continued)

(52) U.S. Cl.
CPC ............ *B65H 19/20* (2013.01); *B23K 26/06* (2013.01); *B23K 26/0846* (2013.01); *B23K 26/0876* (2013.01); *B65H 19/105* (2013.01); *B65H 19/1884* (2013.01); *B65H 19/2207* (2013.01); *B65H 19/26* (2013.01)

(58) Field of Classification Search
CPC .. B23K 2101/16; B23K 26/06; B23K 26/082; B23K 26/0846; B23K 26/0876; B23K 26/38; B65H 19/105; B65H 19/1884; B65H 19/20; B65H 19/2207; B65H 19/26

USPC ................................................ 219/121.78
See application file for complete search history.

(56) References Cited

U.S. PATENT DOCUMENTS

| | | |
|---|---|---|
| 3,764,775 A | 10/1973 | Hasslinger et al. |
| 4,572,683 A | 2/1986 | Hayashi |

(Continued)

FOREIGN PATENT DOCUMENTS

| | | |
|---|---|---|
| EP | 1810944 A1 | 7/2007 |
| JP | H0557474 A | 3/1993 |
| WO | WO-2022094291 A1 | 5/2022 |

OTHER PUBLICATIONS

"U.S. Appl. No. 12/058,335, Non Final Office Action mailed Jun. 4, 2012", 10 pgs.

(Continued)

*Primary Examiner* — Dana Ross
*Assistant Examiner* — Joseph W Iskra
(74) *Attorney, Agent, or Firm* — Schwegman, Lundberg & Woessner, P.A.

(57) ABSTRACT

Techniques for processing a web with a laser are provided. In an example, an apparatus for processing web material can include multiple processing stages and a laser assembly. Each of the multiple processing stages can be configured to process a moving web of material along a web path. The laser assembly can be configured to process the moving web of material with a laser at a first stage of the multiple stages. The laser assembly can include a laser configured to generate a laser beam, a gimble assembly configured to direct the laser beam along a cut path at a position of a web path of the moving web of material, and a servo driven mirror assembly configured to provide an adjustable field of view for the laser stage at the position of the web path.

25 Claims, 8 Drawing Sheets

(51) Int. Cl.
*B65H 19/22* (2006.01)
*B65H 19/26* (2006.01)

(56) References Cited

U.S. PATENT DOCUMENTS

| | | | |
|---|---|---|---|
| 4,638,143 A * | 1/1987 | Akeel | B23K 26/0884 |
| | | | 901/50 |
| 4,673,075 A | 6/1987 | Ueyama et al. | |
| 4,866,238 A | 9/1989 | Karube | |
| 5,054,355 A | 10/1991 | Tisse et al. | |
| 5,641,265 A | 6/1997 | Spada et al. | |
| 5,961,858 A | 10/1999 | Britnell | |
| 6,153,853 A | 11/2000 | Maruyama et al. | |
| 6,722,959 B2 | 4/2004 | Opfer | |
| 6,764,434 B1 | 7/2004 | Volk | |
| 7,013,749 B2 | 3/2006 | Uno | |
| 8,436,272 B2 | 5/2013 | Schiebout | |
| 2001/0041651 A1 | 11/2001 | Abe et al. | |
| 2002/0153358 A1 | 10/2002 | Inoue et al. | |
| 2003/0154695 A1 | 8/2003 | Samborn et al. | |
| 2004/0108305 A1 | 6/2004 | Harnisch et al. | |
| 2005/0087518 A1 | 4/2005 | Hessbruggen et al. | |
| 2005/0204595 A1 | 9/2005 | Gourash et al. | |
| 2009/0242602 A1 | 10/2009 | Schiebout | |
| 2011/0253690 A1 * | 10/2011 | Dane | B23K 26/0643 |
| | | | 219/121.74 |
| 2012/0211154 A1 * | 8/2012 | Brownell | B29C 66/81268 |
| | | | 156/272.8 |
| 2015/0224596 A1 | 8/2015 | Schiebout | |
| 2019/0338958 A1 * | 11/2019 | Livchak | F28F 1/24 |

OTHER PUBLICATIONS

"U.S. Appl. No. 12/058,335, Notice of Allowance mailed Jan. 9, 2013", 6 pgs.

"U.S. Appl. No. 12/058,335, Response filed Oct. 4, 2012 to Non Final Office Action mailed Jun. 4, 2012", 12 pgs.

"International Application Serial No. PCT/US2021/057375, International Search Report mailed Mar. 9, 2022", 5 pgs.

"International Application Serial No. PCT/US2021/057375, Written Opinion mailed Mar. 9, 2022", 5 pgs.

"International Application Serial No. PCT/US2021/057375, International Preliminary Report on Patentability mailed May 11, 2023", 7 pgs.

* cited by examiner

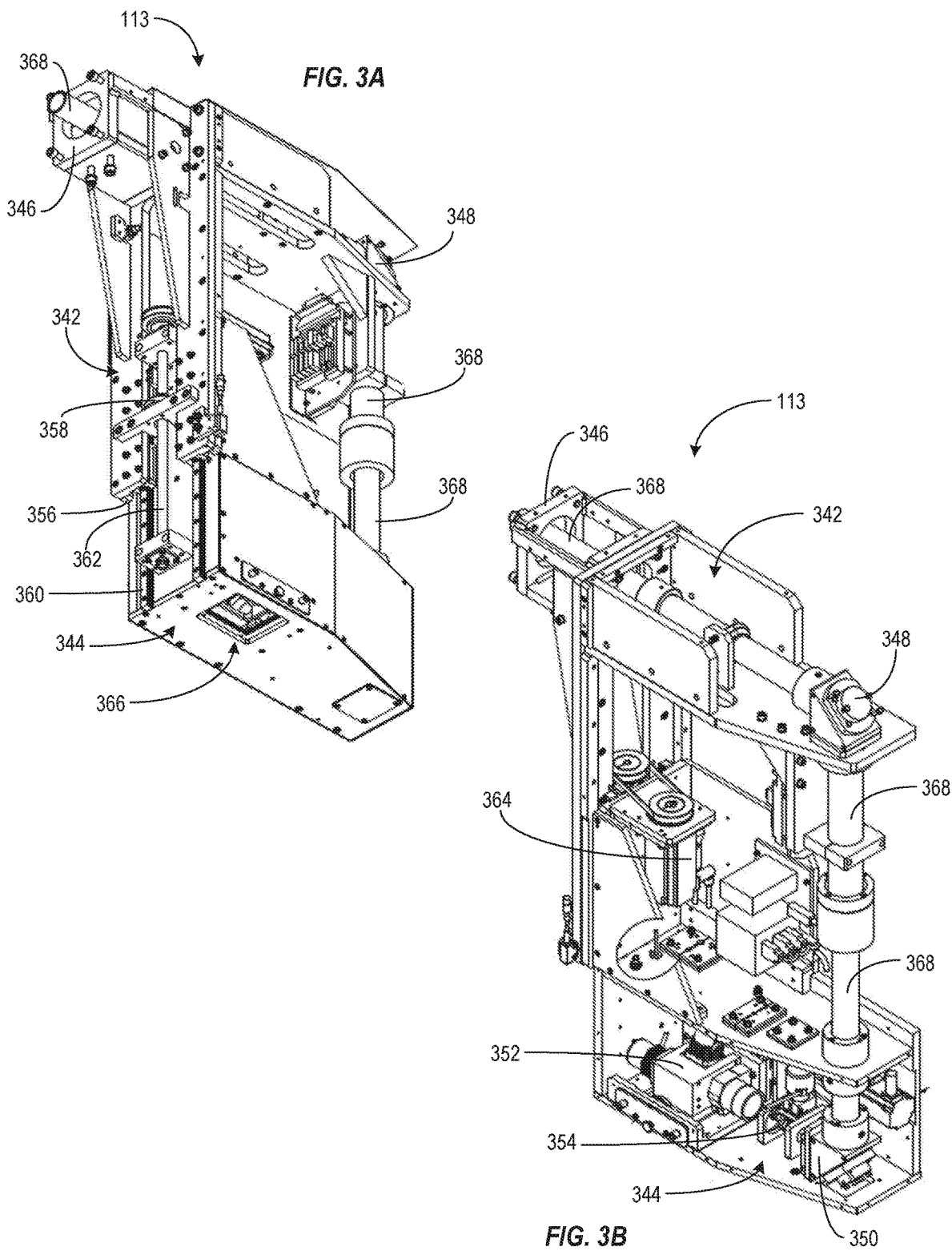

ADJUSTABLE FIELD OF VIEW LASER SYSTEM FOR WEB PROCESSING

FIELD OF THE DISCLOSURE

The present document relates to processing web material, and more particularly, to techniques for a laser system with an adjustable field of view for processing web material

BACKGROUND OF THE DISCLOSURE

Processing moving web material with a laser can open up new avenues for generating web-based products. Laser processing can be very precise and can cut or slit the web in very intricate patterns. However, the field of view of conventional laser systems when employed on a web machine is somewhat fixed, therefore, in order to form parts that require a different field of view, the web path at the laser processing station is modified. Such web path modification can be time consuming and can require a part kit for each different field of view setting. In addition, once the field of view is changed, the laser often needs to be refocused to provide an focused beam at the surface of the web material in the new web path.

SUMMARY OF THE DISCLOSURE

Techniques for processing a web with a laser are provided. In an example, an apparatus for processing web material can include multiple processing stages and a laser assembly. Each of the multiple processing stages can be configured to process a moving web of material along a web path. The laser assembly can be configured to process the moving web of material with a laser at a first stage of the multiple stages. The laser assembly can include a laser configured to generate a laser beam, a gimble assembly configured to direct the laser beam along a cut path at a position of a web path of the moving web of material, and a servo driven mirror assembly configured to provide an adjustable field of view for the laser stage at the position of the web path.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIGS. 3A and 3B illustrate generally a laser head of an example adjustable field of view laser system for a web machine.

DETAILED DESCRIPTION

Examples of the present disclosure are generally directed to techniques for processing a web material in a web machine using a laser with an adjustable field of view. In certain examples, the field of view of the laser system can be adjusted on-the-fly without modifying a web path of the web material. Conventional systems can require that the web path be mechanically raised or lowered to accommodate using a different field of view of a laser. Mechanically adjusting a web path of a web machine can be a time-consuming and multiple step process. Such complexity can introduce opportunities for mistakes that can further result in time-lost to diagnose and correct. The present subject matter allows a portion of a laser apparatus to be raised and lower via servo control to adjust the field of view. In addition, a servo-driven focusing mechanism can also be adjusted, either manually or via formulaic response to the field of view setting, such that the laser beam interface with the web material is at or very near the most efficient focal setting for the type of laser operation.

Figure 1:
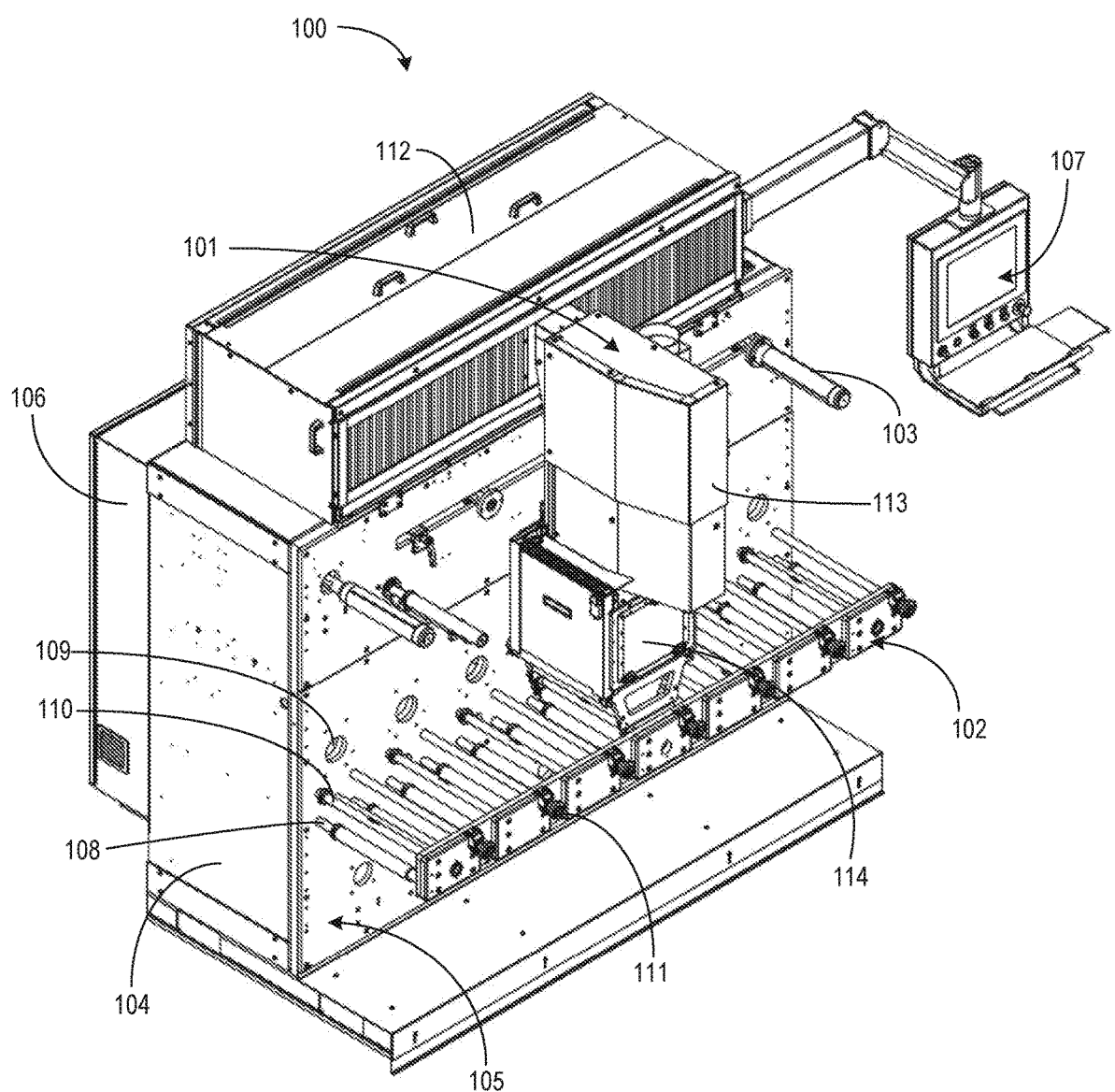
FIG. 1 illustrates generally a web processing machine with an example adjustable field of view laser system.

FIG. 1 illustrates generally a web processing machine 100 with an example adjustable field of view laser system 101. The web processing machine 100 can include a mounting assembly 102 for a number of processing stations, spindles 103, a mechanical cabinet 104 with a mounting backplates 105 for the processing stations, one or more electrical cabinets 106, and an adjustably mounted human machine interface (HMI) 107. In certain examples, the mounting assembly 102 can be cantilevered from the mounting backplates 105. The mounting assembly 102 can include one or more rods 108 at each processing station position to couple a front plate of the mounting assembly 102 to a backplate 105. In certain examples, two of the rods 108 at each position can each include an idler roll. The idler rolls can be used to guide the web material into or out of the station in certain applications. In some examples, the mounting assembly 102 can accommodate various interchangeable mechanical processing components at any one position. The illustrated machine shows seven positions, but it is understood that more or less positions for mounting a processing station can be provided without departing from the present subject matter. The interchangeable mechanical processing components can include, but are not limited to, a die station, a nip station, a coating station, a tamping station, a sealing station, an ultrasonic weld station, or combinations thereof. Once an interchangeable component is installed at a station, if need be, a drive shaft of the interchangeable component can protrude through an access opening 109 of the mounting faceplate and engage a servo motor assembly located in the mechanical cabinet 104 such that a servo motor, via an optional gearbox, can move the at least a portion of the interchangeable component. In certain examples, the rods 108 of mounting assembly 102 can provide a coupling point to secure the interchangeable mechanical processing components at the station position. In some examples, the conduit 110 protruding through a backplate 105 at each position can accommodate ancillary connections of the processing station such as, but not limited to, pneumatic connections for the processing station, electrical connections for sensors or actuators of the processing station, or combinations thereof.

Each processing station can include an adjustment mechanism 111 mounted to the faceplate of the mounting assembly 102 to adjust alignment of the interchangeable component in the cross-web direction. As an example, such alignment can allow a first die cut operation to be aligned in the cross-web direction with subsequent operations such as a subsequent, second die cut. Additional user input devices (not shown) may also be mounted to the faceplate of the mounting assembly 102 to accommodate machine operation and safety.

The spindles 103 can typically be used to unwind raw web material for processing by the web machine or to rewind waste material or finished web material. Some spindles 103 may be servo driven. Some spindles 103 may be pneumatically driven. In certain examples, tension applied to the web material for unwinding or rewinding can be adjusted via the HMI 107 or optionally via a sensor or valve located near the spindle 103. In some examples, a spindle 103 can have an adjustable position to accommodate various different products that may be scheduled to be produce on the machine. In certain examples, a spindle 103 can include a web guide mechanism to align a first web material in a cross-web direction with other processing steps or other web material being processed or to rewind web material in an aligned fashion.

The adjustable field of view laser system 101 can include a laser base 112, a laser head 113, and a laser station assembly 114. The laser head 113 can include a lower laser head portion, and an upper laser head portion. In certain examples, the laser base 112 can be mounted to the top of the mechanical cabinet 104 of the web processing machine 100. The upper portion of the laser head 113 can be mounted to a component of the laser base 112. The lower portion of the laser head 113 can be mounted to the upper portion of the laser head portion 113. The laser base 112 can include the laser and optical components to pass a laser beam of the laser to the laser head 113. In some examples, the laser base 112 can include a carriage mechanism to allow the laser head 113 to be positioned at a first processing station of the web machine 100 for production of a first part, and at a second processing station of the web machine 100 for production of a second part. The lower portion of the laser head 113 be mounted to the upper portion of the laser head 113 via a servo driven carriage such that the field of view of the laser at the web path can be adjusted to the size of the part being produced or to at least the size of the area of the web path on which the laser is to be applied.

Figure 2A:
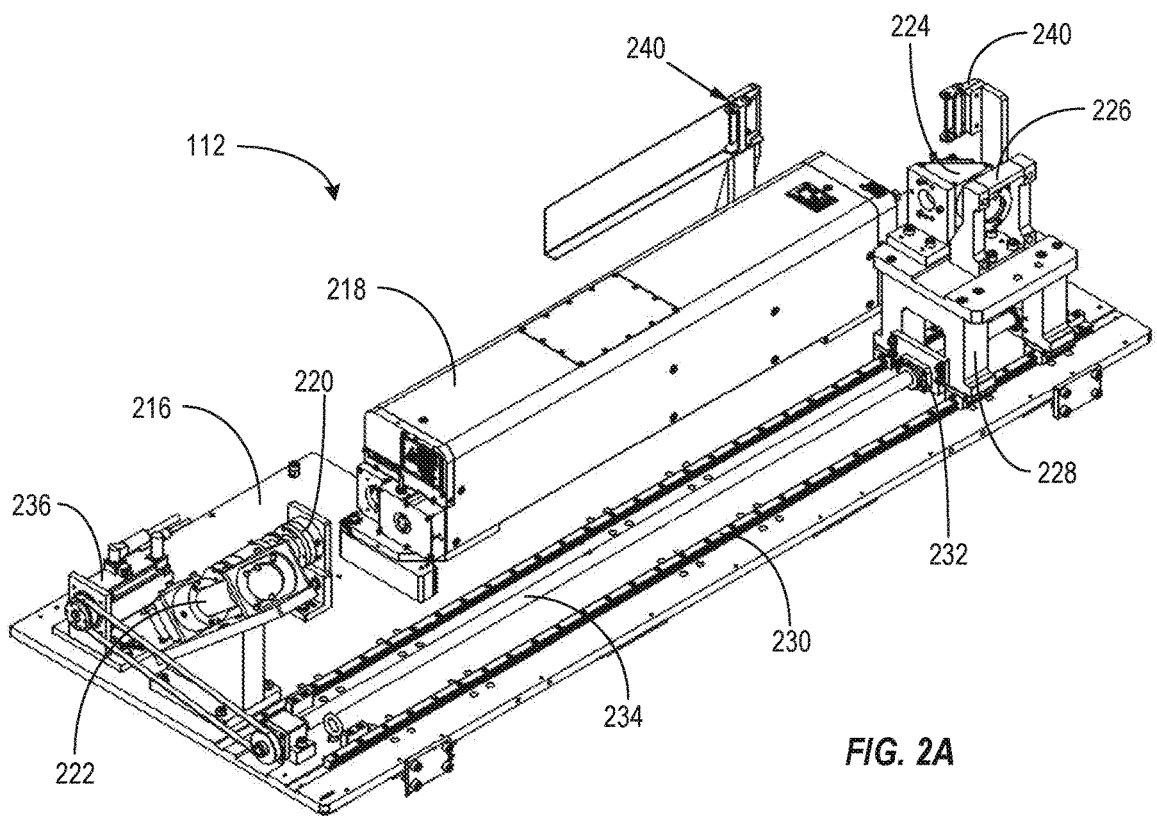
FIGS. 2A and 2B illustrate generally a laser base of an example adjustable field of view laser system with the covers removed.
Figure 2B:
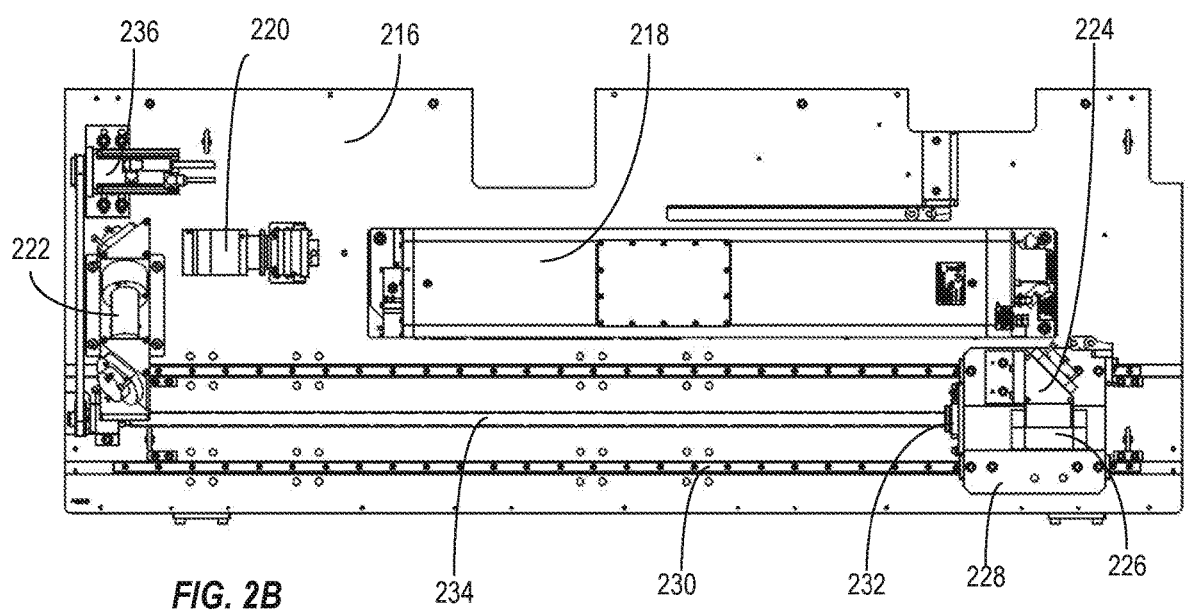

FIGS. 2A and 2B illustrate generally a laser base 112 of an example adjustable field of view laser system with the covers removed. The laser base 112 can include a mounting base 216, a laser 218, and optical components 220, 222, 224 to guide a laser beam generated by the laser to a laser head via a laser head coupling 226. In the illustrated example, the laser head coupling 226 is mounted to an optional carriage 228 supported via linear bearings on a pair of linear rails 230. In certain examples, the nut 232 of a lead screw 234 can be mounted to the carriage 228 and the carriage 228 can be moved and positioned along the linear rails 230 via a servo motor 236 coupled to the lead screw. Such a carriage arrangement can allow the laser head to be positioned anywhere along the range of the linear rails 230. For example, the laser head can be positioned at any one of several processing stations of the multiple processing station of the web machine (FIG. 1, 100) or even between a pair of adjacent processing stations.

The optical components 220, 222, 224 can include multiple mirror assemblies 222, 224 and a laser collimator 220. The multiple mirror assemblies 222, 224 direct the laser beam from the output of the laser 218 to the laser head. The laser collimator 220 provides a collimated beam of laser light. Upon exiting the laser 218, the beams of laser light can be somewhat scattered and not parallel. As such, there is a large chance that a significant portion of the laser light will be lost while trying to direct it to the laser head. The laser collimator 220 captures a significant portion of the scattered beams before they are scattered too far and aligns those beams to provide a collimated beam of laser light. The collimated beam is a beam of laser light that includes a large number of parallel beams resulting in low beam divergence. As such, the beam can travel significant distances without a significant change in the cross-section radius.

The laser base 112 can also include a pair of mounts 240 for a flexible conduit (not shown). At least one of the mounts 240 can include an extended support to keep the flexible conduit from drooping. The flexible conduit can house various tubing and wiring for power and signaling associated with the laser head.

FIGS. 3A and 3B illustrate generally a laser head 113 of an example adjustable field of view laser system for a web machine. The laser head 113 can include an upper portion 342 and a lower portion 344. FIG. 3A shows the laser head 113 with exterior covers of an upper portion 342 removed. FIG. 3B shows the laser head 113 with exterior covers of both the upper portion 342 and the lower portion 344 removed. The upper portion 342 can include a laser base mount 346 to couple with the laser head mount (FIG. 2, 226) of the laser base. The laser head 113 can include multiple optical components 348, 350, 352, 354 to convey the laser beam to the web path as well as to condition the laser beam. In addition, the lower portion 344 can be moved relative to the upper portion 342 to adjust the field of view of the laser at the web path.

To facilitate the motion of the lower portion 344, the upper portion 342 can include linear bearings 356 and a lead screw nut 358. The linear bearings 356 can guide linear rails 360 of the lower portion 344 and the lead screw nut 358 can transfer rotational motion of a lead screw 362 of the lower portion 344 into linear motion of the lower portion 344 relative to the upper portion 342. The lower portion 344 can include a servo motor 364 to rotate the lead screw 362. The lower portion 344 can also include a gimble assembly 352, a focusing assembly 354, and an opening 366 to project the laser beam toward the web path of the web machine. In certain examples, both the upper and lower portions 342, 344 of the laser head. 113 can include tubing 368 to visually isolate the laser beam. The tubing 368 of the upper portion 342 can receive the tubing 368 of the lower portion 344, like a telescope, to allow for adjustment of the field of view.

Figure 4A:
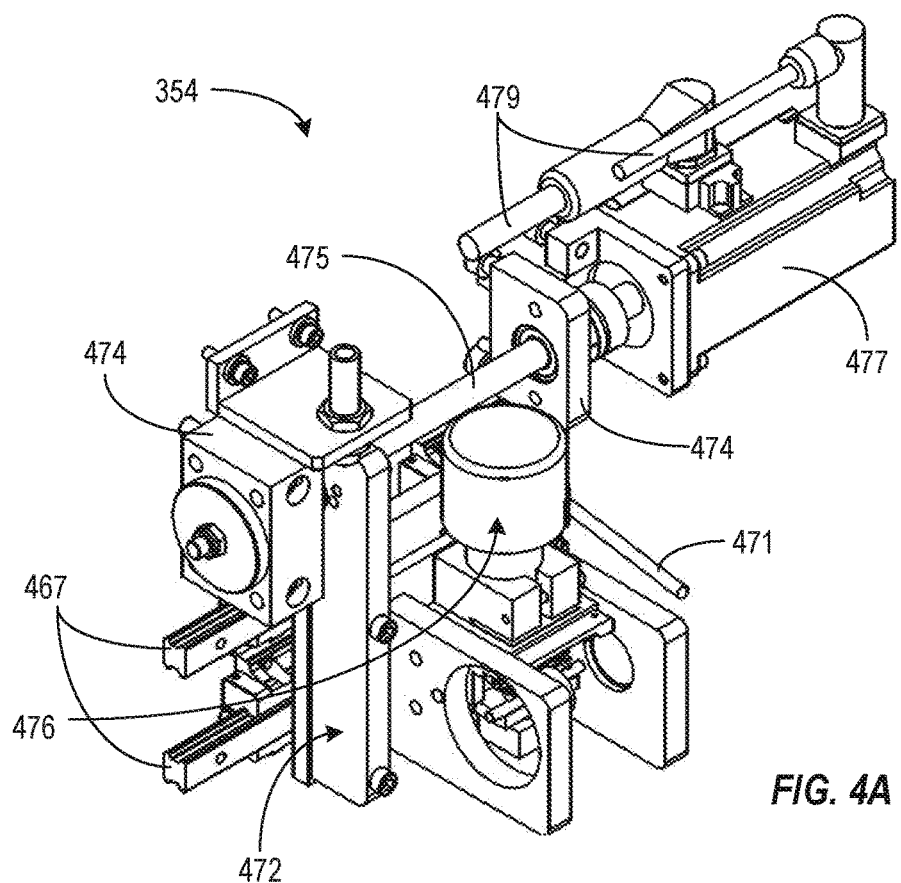
FIGS. 4A and 4B illustrate generally an example focusing assembly of an example laser head of an example adjustable field of view laser system for a web machine.
Figure 4B:
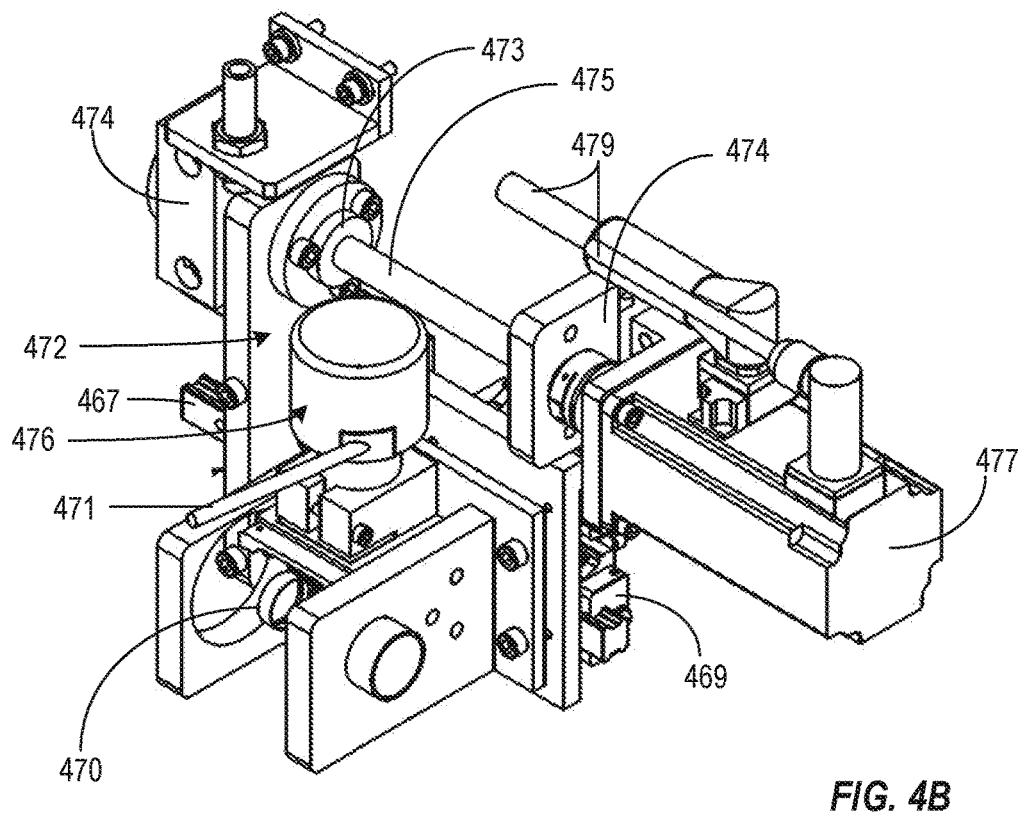

FIGS. 4A and 4B illustrate generally an example focusing assembly 354 of an example laser head of an example adjustable field of view laser system for a web machine. The focusing assembly 354 can include a gimble motor and lens assembly 476 of the gimble assembly (FIG. 3, 352), focusing optics 470, a focus carriage 472, and a focus leadscrew assembly including a lead screw 475, linear rails 467, lead screw bearings and supports 474 and a servo motor 477. The gimble motor and lens assembly 476 can receive signals, via a cable 471, from gimble electronics and can move the lens to direct the laser beam about the field of view. Additional gimble motors in the portion of the gimble assembly 352 located at the opening of the lower portion 344 of the laser head 113 can provide additional direction of the laser beam about the field of view. The gimble motors and related optics can be nimble, precise, and fast. Such motion can allow the laser beam to be used to process a wide variety of parts.

The gimble motor and lens assembly 476 can be mounted with the focusing optics 470, such as one or more focusing lenses, to the focus carriage 472. The focus carriage 472 can be mounted to the focus lead screw assembly via linear bearings 469 and a lead screw nut 473. Rotation of the lead screw 475 of the lead screw assembly can move the focusing optics 470 along an axis defined by the collimated laser beam. Although the collimated laser beam is well defined, as the field of view of the laser system at the web material is adjusted, the focusing optics 470 can provide fine adjustment of the laser beam at the web material. Such fine focusing adjustment can improve product quality over a laser beam without fine adjustment. The lead screw 475 can be driven by a servo motor 477 coupled to a controller and drive of the web machine by one or more cables 479. The lead screw assembly can be coupled to a frame of the lower portion of the laser head. For example, the lead screw 475 can be supported by two lead screw bearings within corresponding bearing supports 474 that can each be bolted to the frame of the lower portion of the laser head.

Figure 5A:
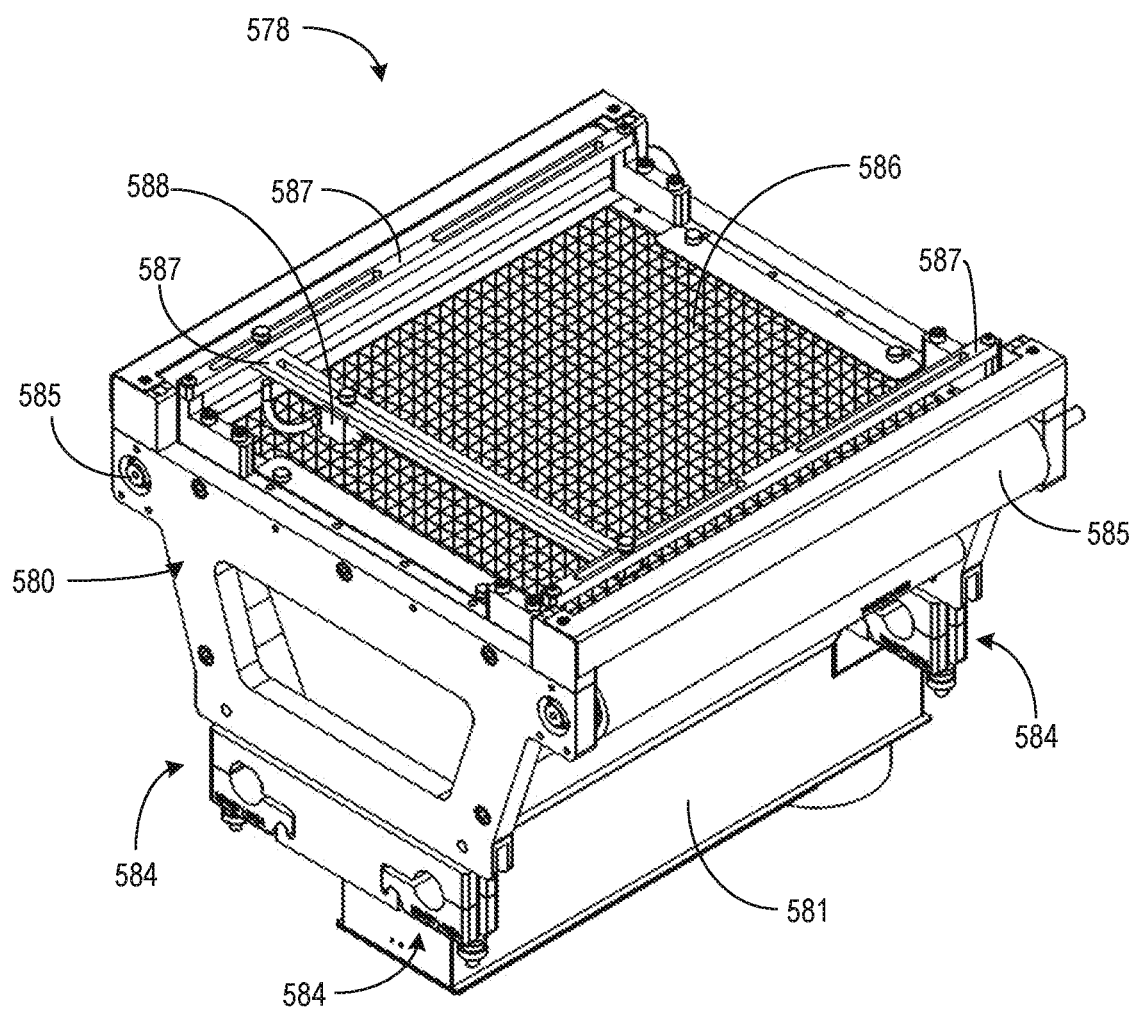
FIG. 5A illustrates generally a lower portion of an example laser processing station.
Figure 5B:
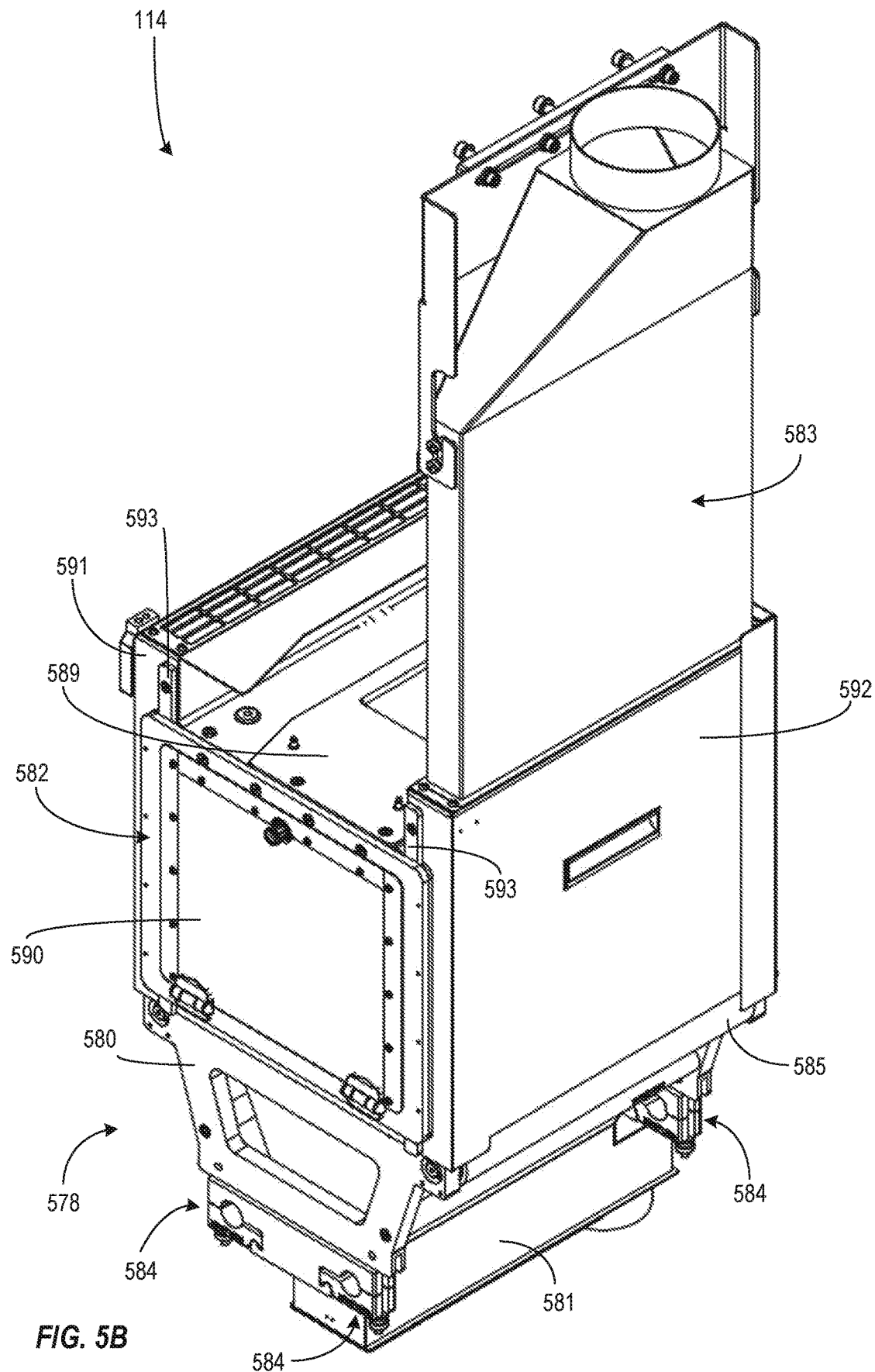
FIG. 5B illustrates generally an example laser processing station including the lower portion.

FIG. 5A illustrates generally a lower portion 578 of an example laser processing station. The lower portion 578 of the laser processing station can include a station mount frame 580, and a lower vent hood 581. FIG. 5B illustrates generally an example laser processing station 114 including the lower portion 578. The laser processing station 114 can include the station mount frame 580, the lower vent hood 581, a processing station enclosure 582, and upper venting 583. The station mount frame 580 of the lower portion 578 can include one or more clamps 584 to securely mount the laser processing station 114 to one of the station positions of the mounting assembly (FIG. 1, 102). In certain examples, the lower portion 578 of the laser processing station 114 can include four clamps 584 that can engage two mounting rods (FIG. 1, 180) of a station position of the mounting assembly.

In certain examples, the lower portion 578 can include two idler rolls 585 for guiding the web material through the laser processing station 114. The lower portion 578 can include a grated surface 586 to support the web material between the idler rolls 585 and to allow fumes to be evacuated via the lower vent hood 581 underneath the grated surface 586. In certain examples, the lower portion 578 can include a registration sensor assembly. The registration sensor assembly can include a mounting bracket 587 and a registration sensor 588. The mounting bracket 587 can support the registration sensor 588 and can allow the registration sensor 588 to be adjusted along the web path and across the web path. In some applications, the registration sensor 588 can be used to sense a repeating feature of the web material such that timing of operations of the laser station 114 or some other station can be adjusted by the controller to make acceptable parts. In some applications, the registration sensor 588 can be used to sense anomalies and the controller can track the sensed anomalies for rejection or some other processing.

In addition to illustrating the lower portion 578 of an example laser processing station, FIG. 5B illustrates the lower portion 578 of the laser processing station 114 assembled with additional venting 583 and protective hardware 582. The venting 583 and protective hardware 582 can include a plate assembly 589 that mounts to the underside of the lower portion (FIG. 3) of the laser head and substantially seals an upper side of the processing area around the web material at the laser processing station 114. The plate assembly 589 can include an access door assembly that can substantially seal a front side of the processing area around the web material at the laser processing station 114. The access door assembly can include an access door 590 to allow a machine operator to access the web material at the laser processing station 114. In certain examples, the access door 590 can include a transparent panel to allow inspection of the web material and operation of the laser, including inspection of the web material and operation of the laser as the web material passes through the laser processing station 114.

In certain examples, the venting 583 and protective hardware 582 can provide additional barriers to enclose the processing area of the laser processing station 114. Such barriers can include an intake vent panel 591 to enclose a left side of the processing area of the laser processing station 114 and an exhaust vent panel 592 to enclose a right side of the processing area of the laser processing station 114. In certain examples, the intake vent panel 591 and the exhaust vent panel 592 can be secured to the mounting frame 580 of the lower portion of the laser processing station. In certain examples, to facilitate adjustment of the field of view of the laser processing station, the access door assembly can with the intake and exhaust vent panels 591, 592 via guide strips 593. Such an interface allows the field of view of the laser to be adjusted by raising or lowering the lower portion of the laser head and the processing area to remain sealed without disassembling or otherwise adjusting the venting 583 and protective hardware 582.

Air handling equipment can be coupled to the lower vent hood 581 and the exhaust vent panel 592 to safely contain and handle fumes generated in the processing area of the laser processing station 114. It is understood that assembly and orientation of the lower vent hood 581 and venting 583 and protective hardware 582 may be different than illustrated in FIGS. 5A and 5B to accommodate variation in the configuration of the web machine and the web path. For example, the positions of the intake vent panel 591 and the exhaust vent panel 592 may be reversed in some examples.

Figure 6:
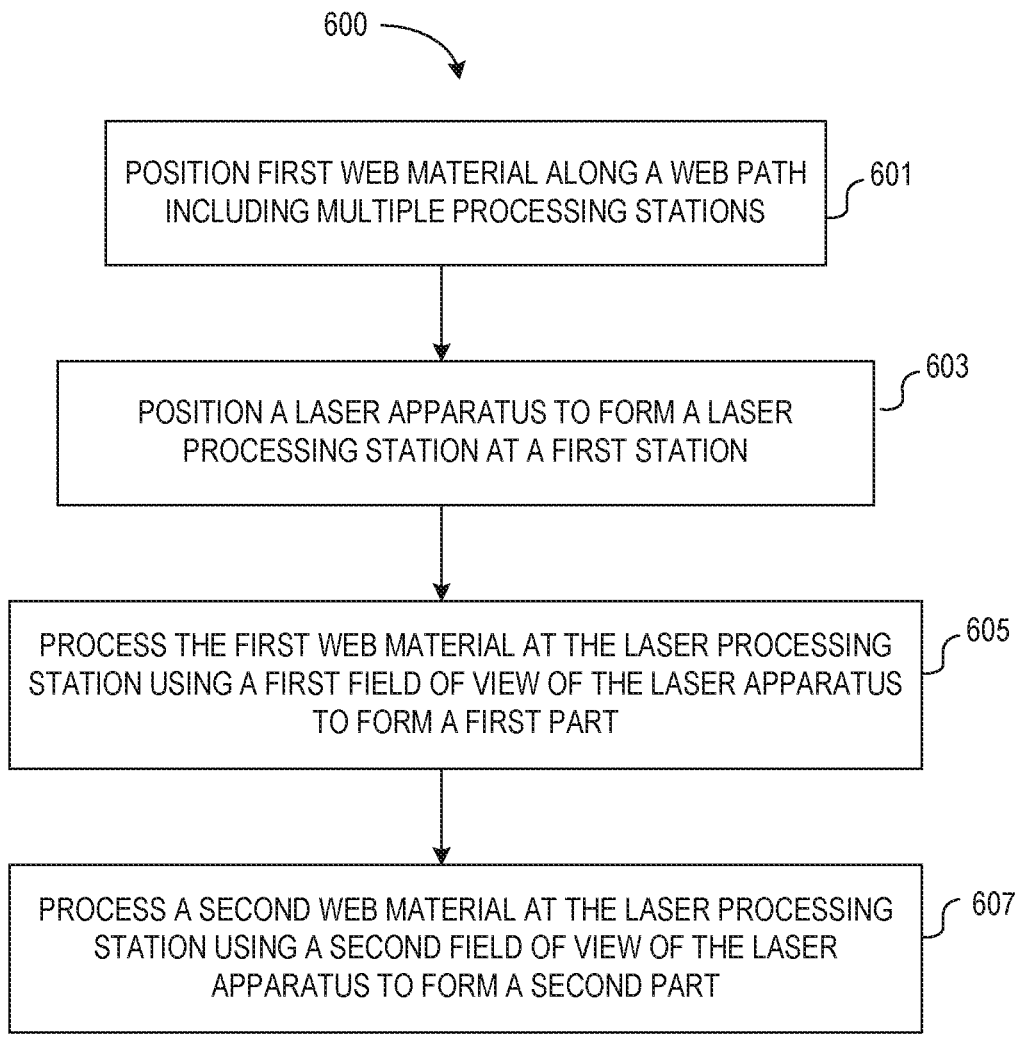
FIG. 6 illustrates generally an example method of operating a web machine with an adjustable field of view laser system.

FIG. 6 illustrates generally an method 600 of operating a web machine with an adjustable field of view laser system. At 601, a first web can be positioned along a web path of a web machine. The web machine can include multiple processing stations. At 603, an adjustable field of view laser system of the web machine can be positioned at a first station to provide a laser processing station of the web machine. At 605, the first web material can be processed at the laser processing station using a first field of view of the adjustable field of view laser system to form a first part. At 607, a second web material can be processed at the laser processing station using a second field of view of the adjustable field of view laser system to form a second part. The first field of view can be a different size than the second field of view. In certain examples, the position or path of the web path does not change between forming the first part and forming the second part.

In some examples, changing the field of view of the adjustable field of view laser system can include using a servo motor to raise or lower a lower portion of a laser head of the adjustable field of view laser system. In certain examples, upon changing the field of view of the adjustable field of view laser system, a servo-driven focusing can be adjusted to maintain a focused beam of laser light at the surface of the web material passing through the laser processing station.

In some examples, the adjustable field of view laser system can be moved to a second processing position different than the position of a first processing station to process a different part. The positioning can be accomplished by moving a servo-driven carriage coupled to the laser head of the adjustable field of view laser system as discussed above with regard to FIG. 2.

Figure 7:
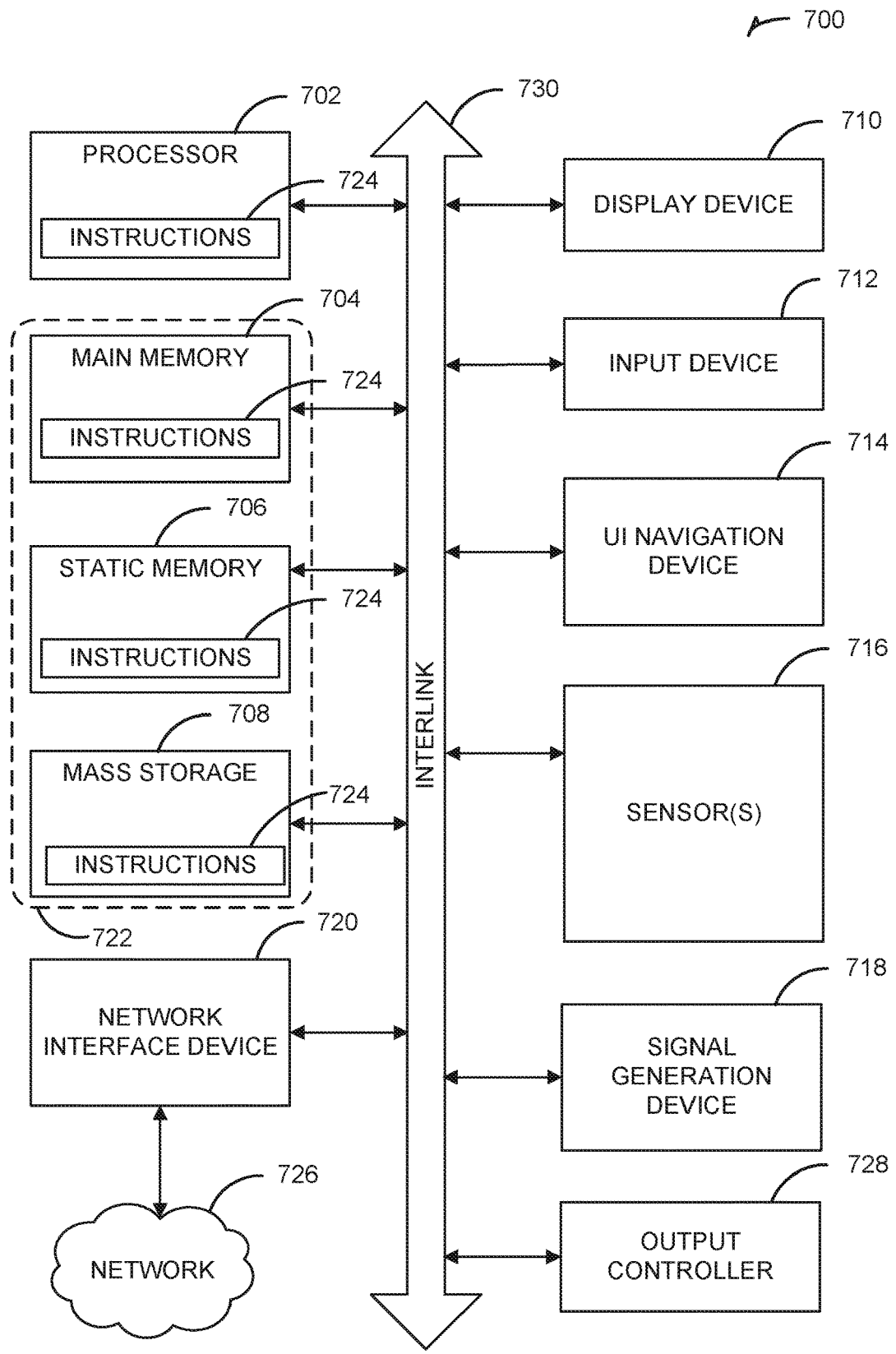
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a stand-alone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the tei ni "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This fauna from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

EXAMPLES AND NOTES

In a first example, Example 1, an apparatus can include multiple processing stations, each station configured to process a moving web of material along a web path; a laser assembly configured to process the moving web of material with a laser at a first station of the multiple processing stations, the laser assembly comprising: a laser configured to generate a laser beam; a gimble assembly configured to direct the laser beam along a cut path at a position of a web path of the moving web of material; and a servo-driven mirror assembly configured to provide an adjustable field of view for the laser assembly at the position of the web path.

In Example 2, the subject matter of Example 1 includes, a servo-driven focus assembly configured to adjust a focus of the laser beam in response to a change in the adjustable field of view.

In Example 3, the subject matter of Example 2 includes, a controller configured to coordinate positioning of the servo-driven mirror assembly and the servo-driven focus assembly to process multiple products without changing a vertical position of the web path at the first station.

In Example 4, the subject matter of Examples 1-3 includes, a backplate, wherein the multiple processing stations are coupled to the backplate.

In Example 5, the subject matter of Example 4 includes, wherein the multiple processing stations are cantilevered from the backplate.

In Example 6, the subject matter of Examples 1-5 includes, wherein the laser assembly includes a ventilation hood configured to capture and direct fumes of the first station.

In Example 7, the subject matter of Example 6 includes, wherein the ventilation hood includes a transparent member configured to allow observation of the moving web of material at the first station.

In Example 8, the subject matter of Examples 1-7 includes, wherein the laser assembly includes a lateral motion system configured to move the laser assembly along the web path and to position the laser assembly at a second station of the multiple processing stations.

Example 9 is a method of operating a web processing machine, the method can include positioning first web material along a web path including multiple processing stations; positioning a laser apparatus to form a laser processing station at a first station of the multiple processing stations; processing the first web material at the laser processing station using a first field of view of the laser apparatus to form a first part; processing a second web material at the laser processing station using a second field of view of the laser apparatus to form a second part; and wherein a position of the web path through the laser processing station does not change between forming the first part and forming the second part.

In Example 10, the subject matter of Example 9 includes, wherein an area defined by the first field of view is a different size than an area defined by the second field of view.

In Example 11, the subject matter of Examples 9-10 includes, re-positioning the laser processing station at a second station of the multiple processing stations to provide the second part.

In Example 12, the subject matter of Example 11 includes, wherein re-positioning the laser processing station includes moving a portion of the laser processing station laterally along the web path from the first station.

In Example 13, the subject matter of Examples 9-12 includes, wherein processing the second web material at the laser processing station using a second field of view of the laser apparatus includes re-positioning a mirror assembly of the laser apparatus, via a first servo motor, along an axis perpendicular to a plane defined by the second web material.

In Example 14, the subject matter of Example 13 includes, wherein processing the second web material at the laser processing station using a second field of view of the laser apparatus includes re-positioning a focus assembly of the laser apparatus, via a second servo motor, along an axis perpendicular to the plane defined by the second web material.

In Example 15, the subject matter of Examples 9-14 includes, wherein processing the first web material includes evacuating fumes from the first station via a vacuum hood of the laser apparatus.

Example 16 is a machine-readable medium including instructions that, when executed by processing circuitry, cause processing circuitry to perform operations, the operations can include moving a first web material along a web path including multiple processing stations; positioning a laser apparatus to form a laser processing station at a first station of the multiple processing stations; processing the first web material at the laser processing station using a first field of view of the laser apparatus to form a first part; processing a second web material at the laser processing station using a second field of view of the laser apparatus to form a second part; and wherein a position of the web path through the laser processing station does not change from forming the first part to forming the second part.

In Example 17, the subject matter of Example 16 includes, wherein an area defined by the first field of view is a different size than an area defined by the second field of view.

In Example 18, the subject matter of Examples 16-17 includes, wherein the operations include re-positioning the laser processing station at a second station of the multiple processing stations to provide the second part.

In Example 19, the subject matter of Example 18 includes, wherein the operations of re-positioning the laser processing station includes moving a portion of the laser processing station laterally along the web path from the first station.

In Example 20, the subject matter of Examples 16-19 includes, wherein the operations of processing the second web material at the laser processing station using a second field of view of the laser apparatus includes re-positioning a mirror assembly of the laser apparatus, via a first servo motor, along an axis perpendicular to a plane defined by the second web material.

In Example 21, the subject matter of Example 20 includes, wherein the operations of processing the second web material at the laser processing station using a second field of view of the laser apparatus includes re-positioning a focus assembly of the laser apparatus, via a second servo motor, along an axis perpendicular to the plane defined by the second web material.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

What is claimed is:

1. An apparatus comprising:
multiple processing stations, each station configured to process a moving web of material along a web path;
a laser assembly configured to process the moving web of material with a laser at a first station of the multiple processing stations, the laser assembly comprising:
a laser configured to generate a laser beam;
a gimble assembly configured to direct the laser beam along a cut path at a position of a web path of the moving web of material;
a servo-driven mirror assembly configured to provide an adjustable field of view for the laser assembly at the position of the web path; and
a servo-driven focus assembly configured to move focusing optics along an axis defined by the laser beam to adjust a focus of the laser beam in response to a change in the adjustable field of view,
wherein the servo-driven focus assembly includes a servo motor, a lead screw configured to be rotated by the servo motor, and a focus carriage in which the focusing optics are mounted, wherein the apparatus is configured to move the focus carriage along the axis defined by the laser beam when the lead screw rotates.

2. A method of operating a web processing machine, the method comprising:
positioning first web material along a web path including multiple processing stations;
positioning a laser apparatus to form a laser processing station at a first station of the multiple processing stations;
processing the first web material at the laser processing station using a first field of view of the laser apparatus to form a first part and using focusing optics in a first position along an axis defined by a laser beam to focus the laser beam to form the first part;
processing a second web material at the laser processing station using a second field of view of the laser apparatus to form a second part and using focusing optics in a second position along the axis defined by the laser beam to focus the laser beam to form the second part, wherein the first and second positions are different; and
controlling a servo motor to rotate a lead screw to move a focus carriage, in which the focusing optics are mounted, using linear bearings along the axis defined by the laser beam,
wherein a position of the web path through the laser processing station does not change between forming the first part and forming the second part.

3. A machine-readable medium including instructions that, when executed by processing circuitry, cause processing circuitry to perform operations, the operations comprising:
moving a first web material along a web path including multiple processing stations;
positioning a laser apparatus to form a laser processing station at a first station of the multiple processing stations;
processing the first web material at the laser processing station using a first field of view of the laser apparatus to form a first part and using focusing optics in a first position along an axis defined by a laser beam to focus the laser beam to form the first part;

processing a second web material at the laser processing station using a second field of view of the laser apparatus to form a second part and using focusing optics in a second position along the axis defined by the laser beam to focus the laser beam to form the second part, wherein the first and second positions are different; and controlling a servo motor to rotate a lead screw to move a focus carriage, in which the focusing optics are mounted, using linear bearings along the axis defined by the laser beam, wherein a position of the web path through the laser processing station does not change from forming the first part to forming the second part.

4. The apparatus of claim 1, wherein
the servo-driven focus assembly is configured to linearly move the focusing optics in line with the axis defined by the laser beam.

5. The apparatus of claim 1, including a controller configured to coordinate positioning of the servo-driven mirror assembly and the servo-driven focus assembly to process multiple products without changing a vertical position of the web path at the first station.

6. The apparatus of claim 1, including a backplate, wherein the multiple processing stations are coupled to the backplate.

7. The apparatus of claim 6, wherein the multiple processing stations are cantilevered from the backplate.

8. The apparatus of claim 1, wherein the laser assembly includes a ventilation hood configured to capture and direct fumes of the first station.

9. The apparatus of claim 8, wherein the ventilation hood includes a transparent member configured to allow observation of the moving web of material at the first station.

10. The apparatus of claim 1, wherein the laser assembly includes a lateral motion system configured to move the laser assembly along the web path and to position the laser assembly at a second station of the multiple processing stations.

11. The method of claim 2, further comprising
linearly moving the focusing optics in line with the axis defined by the laser beam from the first position to the second position.

12. The method of claim 2, wherein an area defined by the first field of view is a different size than an area defined by the second field of view.

13. The method of claim 2, including re-positioning the laser processing station at a second station of the multiple processing stations to provide the second part.

14. The method of claim 13, wherein re-positioning the laser processing station includes moving a portion of the laser processing station laterally along the web path from the first station.

15. The method of claim 2, wherein processing the second web material at the laser processing station using a second field of view of the laser apparatus includes re-positioning a mirror assembly of the laser apparatus, via a first servo motor, along an axis perpendicular to a plane defined by the second web material.

16. The method of claim 15, wherein processing the second web material at the laser processing station using a second field of view of the laser apparatus includes re-positioning a focus assembly of the laser apparatus, via a second servo motor, along an axis perpendicular to the plane defined by the second web material.

17. The method of claim 2, wherein processing the first web material includes evacuating fumes from the first station via a vacuum hood of the laser apparatus.

18. The machine-readable medium of claim 3, wherein A machine-readable medium including instructions that, when executed by processing circuitry, cause processing circuitry to perform operations, the operations further comprise
linearly moving the focusing optics in line with the axis defined by the laser beam from the first position to the second position.

19. The machine-readable medium of claim 3, wherein an area defined by the first field of view is a different size than an area defined by the second field of view.

20. The machine-readable medium of claim 3, wherein the operations include re-positioning the laser processing station at a second station of the multiple processing stations to provide the second part.

21. The machine-readable medium of claim 20, wherein the operations of re-positioning the laser processing station includes moving a portion of the laser processing station laterally along the web path from the first station.

22. The machine-readable medium of claim 3, wherein the operations of processing the second web material at the laser processing station using a second field of view of the laser apparatus includes re-positioning a mirror assembly of the laser apparatus, via a first servo motor, along an axis perpendicular to a plane defined by the second web material.

23. The machine-readable medium of claim 22, wherein the operations of processing the second web material at the laser processing station using a second field of view of the laser apparatus includes re-positioning a focus assembly of the laser apparatus, via a second servo motor, along an axis perpendicular to the plane defined by the second web material.

24. The apparatus of claim 1, further comprising a controller configured to control the servo motor to adjust the focus of the laser beam in response to the change in the adjustable field of view.

25. The apparatus of claim 1, further comprising a lead screw nut configured to receive the lead screw and comprising linear bearings, wherein the focus carriage is connected to the lead screw nut, wherein the apparatus is configured to cause the focus carriage to move along the linear bearings when the lead screw rotates within the lead screw nut.

* * * * *

UNITED STATES PATENT AND TRADEMARK OFFICE
CERTIFICATE OF CORRECTION

| | | |
|---|---|---|
| PATENT NO. | : 12,030,735 B2 | Page 1 of 1 |
| APPLICATION NO. | : 16/949505 | |
| DATED | : July 9, 2024 | |
| INVENTOR(S) | : Oakes et al. | |

It is certified that error appears in the above-identified patent and that said Letters Patent is hereby corrected as shown below:

In the Claims

In Column 13, Line 16, in Claim 4, after "wherein", delete a linebreak

In Column 13, Line 41, in Claim 11, after "comprising", delete a linebreak

In Column 14, Line 14, in Claim 18, delete "A" and insert --a-- therefor

In Column 14, Line 17, in Claim 18, after "comprise", delete a linebreak

Signed and Sealed this
Fifteenth Day of October, 2024

*Katherine Kelly Vidal*

Katherine Kelly Vidal
*Director of the United States Patent and Trademark Office*